United States Patent

[11] 3,537,351

[72] Inventor Joel D. Eck
  Lincoln Township, Sedgwick County, Kans. (Rte. 2, Valley Center, Kansas 67147)
[21] Appl. No. 768,704
[22] Filed Oct. 18, 1968
[45] Patented Nov. 3, 1970

[54] POWER HACKSAW
  12 Claims, 6 Drawing Figs.
[52] U.S. Cl. .................................................. 83/647
[51] Int. Cl. ........................................... B23d 49/04
[50] Field of Search .......................................... 83/646, 647, 644, 647.5

[56] References Cited
UNITED STATES PATENTS
| | | | |
|---|---|---|---|
| 1,274,820 | 8/1918 | Van Auken | 83/647X |
| 1,651,101 | 11/1927 | Pays | 83/647 |
| 1,810,746 | 6/1931 | Babin et al. | 83/647 |

FOREIGN PATENTS
| | | | |
|---|---|---|---|
| 585,461 | 12/1924 | France | 83/647 |

Primary Examiner—James M. Meister
Attorney—Robert E. Breidenthal

ABSTRACT: A power hacksaw wherein the saw blade is carried at the lower ends of an inverted U-shaped carriage, such carriage being movably and dependingly supported from a pivotally mounted beam by means of a pair of links pivotally connected to the carriage and the beam in an arrangement such that the carriage and its blade are guided to travel along a path inclined to the beam. The beam is pivotally mounted on a frame in such an arrangement that coaction of the saw blade with a workpiece held in a vice on the frame oscillates the beam and thereby causes the blade to rock in a vertical plane. To further enhance such rocking of the blade, the four pivotal connections of the links depart from locations corresponding to the apices of an exact parallelogram. Reciprocal motion along its travel path is imparted to the carriage by a pitman having its opposite ends pivotally connected to the carriage and to a power driven crank rotatably mounted on the frame in an arrangement that the pitman rocks through a horizontal plane.

INVENTOR.
JOEL D. ECK
BY
Robert E Breidenthal
ATTORNEY

INVENTOR.
JOEL D. ECK
ATTORNEY

POWER HACKSAW

The present invention pertains to new and useful improvements in power driven hacksaws, and more particularly relates to machines of such character wherein the blade is rocked relative to the workpiece while being reciprocated.

The primary object of the invention is to provide a sawing machine wherein the sawing blade is rocked and caused to bear against the workpiece in such a manner as to cut efficiently while minimizing blade wear and tooth breakage.

Another important object of the invention is to provide a power hacksaw machine such that wear of working parts will result in little or no misalignment of the blade with respect to either the workpiece or the direction of the force with which the blade is urged into the cut.

Still another important object of the invention is to provide a power hacksaw machine wherein the force of the blade bearing against the cut is reduced on the return stroke to an extent that tends to increase with any increase in the force that must be exerted on the blade to effect the return stroke.

Yet another important object is to provide a sawing machine of the character specified above that is simple, requiring few parts, and which is reliable and durable in operation while being economical to operate and manufacture.

A broad aspect of the invention involves, in a sawing machine, the improvement comprising a frame, an elongated beam having one end pivotally mounted on the frame for vertical swinging movement of the other end thereof about a horizontal axis, said beam being disposed in a generally horizontal attitude during operation of the machine, movable carriage means for holding a saw, means for dependingly supporting the carriage means from the beam and also for guiding movement of the carriage means along a travel path relative to the beam that has direction components both normal and parallel to the extent of the beam, means for moving the carriage means in first one direction and then the other along said travel path, and means for holding a workpiece mounted on said frame, whereby the beam is caused to oscillate during movement of the carriage means when a saw blade is operating on a workpiece. A somewhat more limited aspect of the invention involves the carriage means being guided along its travel path in such a manner that the carriage means oscillates in a plane normal to the horizontal axis during movements along its travel path.

Still another broad aspect of the invention involves, in a sawing machine, the improvement comprising a frame, an elongated beam pivotally mounted adjacent one end thereof on the frame for vertical swinging movement of the other end thereof about a horizontal axis, said beam being normally generally horizontally disposed whereby said beam is gravitationally urged to move said other end of the beam downwardly, a movable saw carriage means for holding a saw, means for movably mounting the carriage means on the beam comprising a pair of elongated links, each of said links having its opposite ends pivotally connected to the beam and the carriage means, respectively, with such pivotal connections of said links being about axes parallel to said horizontal axis, said links lying in a common plane normal to said horizontal axis and being spaced from each other, and means for oscillating said links about the axes of their pivotal connections to the beam.

A very important feature of the invention resides in the saw carriage being dependingly supported from a pivotally mounted beam by a pair of links pivotally connected between the carriage and the beam, whereby movement of the carriage relative to the beam is at least in part inclined to the extent of the beam. Indeed, such arrangement results in two travel path portions that are oppositely inclined to the extent of the beam.

Inclination of the travel path results in oscillation of the beam and consequent rocking movement of the blade.

An optional but preferred feature of the invention resides in the four pivotal connections of the links departing from coincidence with the apices of an exact parallelogram, whereby a rocking action is imparted to the blade by reason of the fact that the motion of the carriage is not purely linear with respect to the beam.

Another important feature of the invention resides in the links being connected to the carriage at positions below the blade, whereby the weight of the beam is applied to the carriage in a manner tending to pull, rather than to push, the blade down through the workpiece, whereby the carriage and the blade are greatly stabilized against cocking over sidewise even if the bearings of the pivotal connections tend to become worn.

Yet another important feature of the invention resides in the pitman and the crank driving the same being positioned in such a manner that the pitman alternately delivers upward and downward forces to the blade carriage during alternate directions of carriage movement.

These and other objects, aspects, features and advantages of the invention will become manifest during the ensuing description of a preferred embodiment of the invention, such description being given in conjunction with the accompanying drawings illustrative of such embodiment, wherein.

Figure 1:
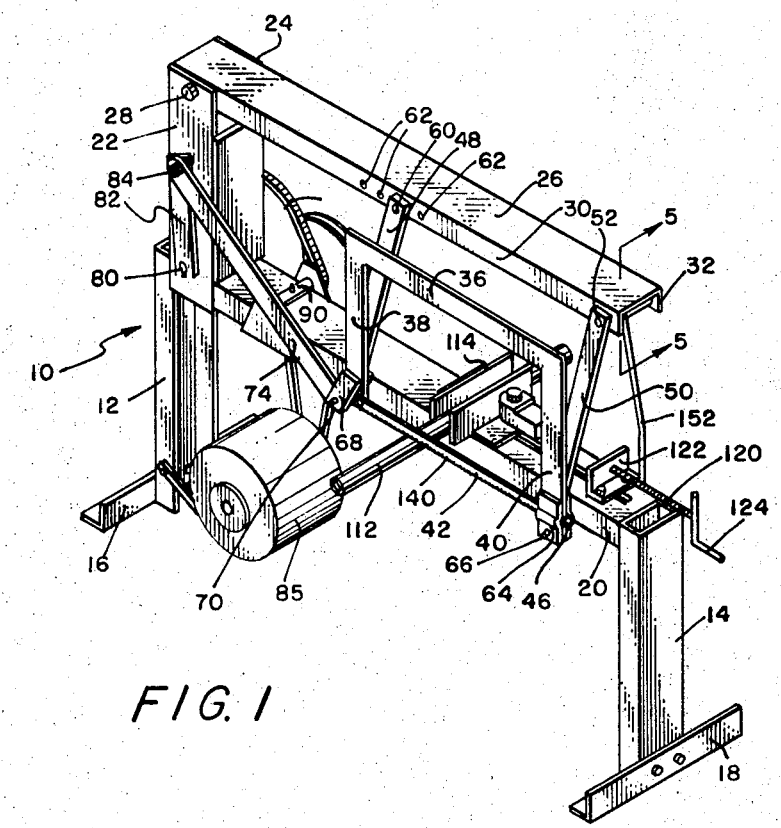
FIG. 1 is an isometric view of the power hacksaw machine.
Figure 2:
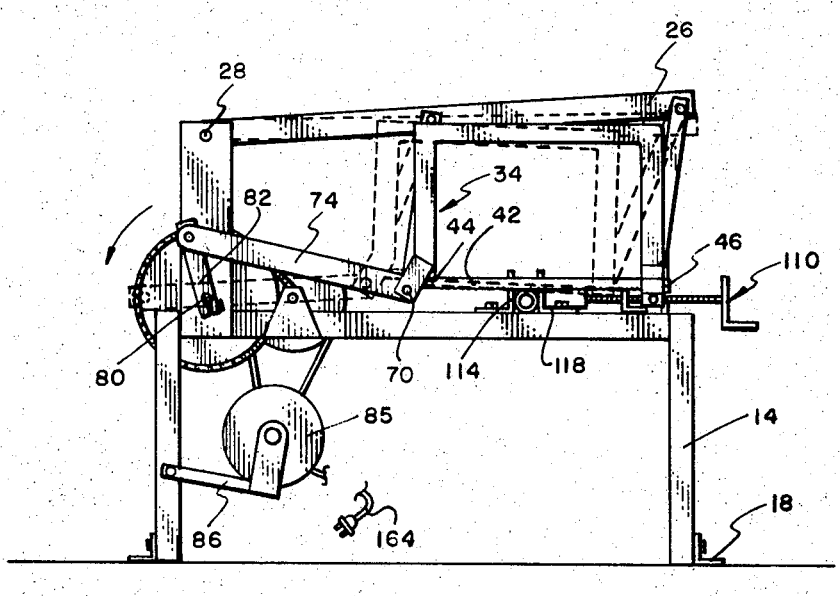
FIG. 2 is a front elevational view of the machine, with the full lines corresponding to the position of the machine parts as shown in FIG. 1, and with the dashed lines showing another relationship of the machine parts.
Figure 3:
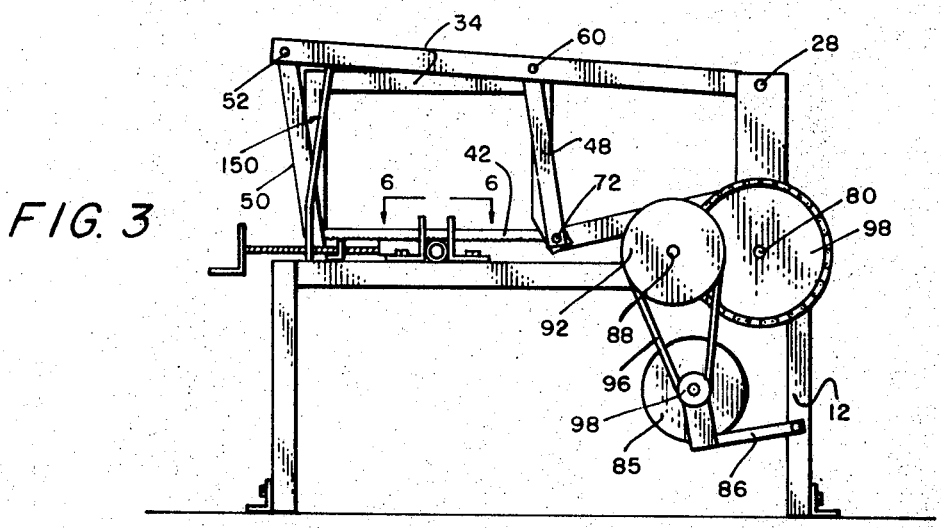
FIG. 3 is a rear elevational view of the machine, with the machine parts positioned as shown in FIG. 1.
Figure 4:
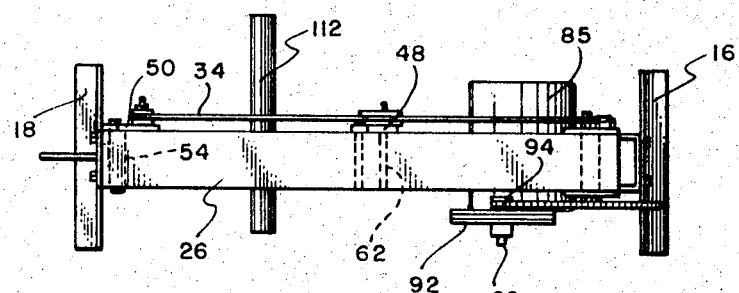
FIG. 4 is a plan view of the machine as shown in FIG. 1.

Referring now to the drawings wherein like numerals designate like parts throughout the various views, the reference numeral 10 designates the power hacksaw machine generally, the same being comprised of a frame constituted of a pair of vertical support legs 12 and 14 disposed respectively at left- and right-hand ends of the machine 10 as viewed in FIGS. 1 and 2. The lower ends of the legs 12 and 14 are fixedly attached to the center portions of horizontal angle members 16 and 18, respectively, for the purpose of providing stable ground support. The frame additionally includes a horizontal frame member 20 having its opposite ends rigidly attached to the upper ends of the legs 12 and 14. The frame member 20 can conveniently be a channel iron with the channel thereof opening downwardly. The frame additionally includes a pair of spaced rectangular steel plates 22 and 24 disposed on opposite sides of the horizontal frame member 20 adjacent the leg 12, the plates 22 and 24 having their lower end margins fixed to the frame member 20 in any suitable manner, such as by welding or the like so as to extend upwardly from the member 20 in spaced parallel relation.

The frame, as will be evident, is formed of steel and can be fabricated by means of welding or riveting from standard steel configurations, angles, channels, and the like. Such frame pivotally supports a beam 26, such beam 26 being in the form of a steel channel that opens downwardly. The beam 26 is disposed in a generally horizontal attitude, and is spaced above and has a longitudinal extent approximating that of the frame member 20. One end of the beam 26 extends between the upper ends of the plates 22 and 24, and a pivot pin 28 extends through the leg portions 30 and 32 of the beam 26 and through the plates 22 and 24 in an arrangement such that the beam 26 swings vertically about the horizontal axis defined by the pivot pin 28. It will be noted that the axis of the pivot pin 28 is perpendicular to the longitudinal extent of the beam 26.

A saw carriage 34 is provided, such saw carriage being of steel and in the form of an inverted U and defined by a horizontal web portion 36 connecting depending leg portions 38 and 40. Spaced above the lower ends of the leg portions 38 and 40 is a hacksaw blade 42, the hacksaw blade 42 being approximately parallel to the web portion 36 of the carriage 34. The lower end portions are provided at positions spaced above the lower ends thereof with conventional means at 44 and 46 for engaging releasably the opposite ends of the conventional hacksaw blade 42 and tensioning the latter between the leg portions 38 and 40.

Figure 5:
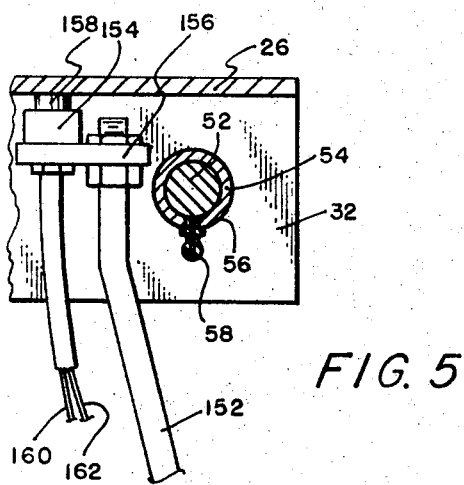
FIG. 5 is an enlarged sectional detail view taken upon the plane of the section line 5–5 in FIG. 1; and, FIG. 6 is an enlarged fragmentary plan view taken upon the plane of the line 6–6 in FIG. 3.
Figure 6:
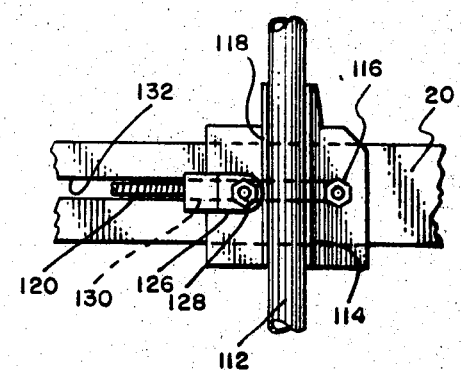

Means is provided for dependingly supporting and guiding the saw carriage 34 from the beam 26. Such means comprises the provision of a pair of coplanar and spaced links 48 and 50. The upper end of the right-hand link 50, as seen in FIGS. 1 and 2, is disposed at the outer face of the depending leg 30 of the channel defining the beam 26 and the link 50 is pivotally connected to the beam 26 by a pivot pin 52 parallel to the pivot pin 28. In the preferred construction, a tubular metallic bearing element 54 extends through aligned openings 56 in the legs 30 and 32 of the channel shaped beam 26, and the pivot pin 52 is journaled through the link 50 and the bearing element 54, the latter being fixedly secured to the beam 26 in any suitable manner. In order to minimize friction between the pivot pin 52 and the tubular bearing element or sleeve 54, the latter is provided with a lubrication or grease fitting 58 as shown in FIG. 5. The upper end of the link 48 is also disposed at the outer side of the leg 30 of the beam 26 and is pivotally connected to the beam 26 by means of a pivot pin 60. In the preferred construction, the pivot pin 60 is journaled through the link 48 and through lubricated bearing structure analogous to that shown in FIG. 5 and described above in relation to the pivot pin 52. For a purpose subsequently to be described, means is provided whereby the spacing of the pivot pins 52 and 60 along the length of the beam 26 is provided. Such means can conveniently take the form of one or more additional tubular bearing sleeves, such as those indicated at 62 being fixed to and extending through the beam 26 at positions spaced along the length of the latter, whereby the upper end of the link 58 can be juxtaposed to any selected one of the bearing sleeves 62 and the pivot pin 60 extended through such selected sleeve 62 and the link 48.

The lower end of the link 50 is pivotally connected to the lower end of the carriage leg 40 by means of a pivot bearing assembly 64 that includes a lubrication or grease fitting 66. The axis of the pivotal connection between the link 50 and the leg 40 which is in substantial alignment with the grease fitting 66 is as will be noted disposed below the hacksaw blade 42. The lower end of the link 48 is pivotally connected to the lower end portion of the carriage leg 38 by means of a pivot bearing assembly 68 that includes a grease fitting 70. It will be noted that the axis of the pivot 72 (which is in substantial alignment with the grease fitting 70) is disposed below the hacksaw blade 42 as in the case of the pivot assembly 64. The pivot assembly 68 not only establishes a pivotal connection between the carriage 34 and the link 48, but additionally establishes a pivotal connection between the link 48 and a pitman 74 that is provided for a purpose to be presently explained. Suffice for the present is to note that the pivot element 72 is common to the pivotal connections of the link 48 to both the carriage 34 and the pitman 74.

The links 48 and 50 lie in a common plane that is vertical to the axis of the pivot pin 28, and the carriage 34 lies in a plane parallel to but spaced from that of the links 48 and 50. The lateral spacing of the saw carriage 34 from the links 48 and 50 is a consequence of the pivot assemblies 64 and 68 being laterally enlarged.

Means inclusive of the pitman 74 alluded to previously is provided for causing the links 48 and 50 to oscillate about the axes of their pivotal connections to the beam 26. Such means comprises a shaft 80 journaled for rotation through the plates 22 and 24, such shaft 80 being parallel to and spaced below the pivot pin 28. A radially extending arm 82 is fixed to the end of the shaft 80 at the front of the plate 22, and the end of the pitman 74 remote from the carriage 34 is pivotally connected to the radially outer end of the arm 82 by means of a pivot pin 84.

An electric motor 85 is mounted on a bracket 86 attached to the leg 12. A shaft 88 is journaled through a bearing assembly 90 fixed to the frame member 20, and such shaft 88 is provided with pulleys 92 and 94. The shaft 88 is driven in rotation by means of a belt 96 entrained over the output pulley 98 of the motor 85 and the pulley 92. A pulley 98 is fixed to the shaft 80 on the side of the machine 10 opposite the arm 82, and a drive belt is entrained over the pulleys 94 and 98. The arrangement is such that the electric motor 85 will, when energized, cause the shaft 80 and the arm 82 carried thereby to rotate, a substantial reduction in rate of rotation being effected by the pulley 92 being much larger than the pulley 98, and by the pulley 98 being much larger than the pulley 94.

Means designated generally at 110 is provided for holding a workpiece such as the piece of tubing indicated at 112 in position for being sawed. The means 110 comprises a vice carried by the frame member 20 consisting of a jaw 114 fixed to the frame member 20 by a nut and bolt designated at 116. The vice also includes a movable jaw 118 that is movable along the top of the frame member 20 towards and away from the fixed jaw 114. Means is provided for urging movement of the jaw 118 and also for guiding the latter in its movement. Such means comprises an elongated threaded shaft 120 that is threaded through a bracket 122 that is fixed to the top of the frame member 20. The threaded shaft 120 is parallel to and spaced above the frame member 20 and the end thereof remote from the jaw 118 is provided with a hand crank 124. The end of the threaded shaft 120 opposite the hand crank 124 is rotatably retained in a rotary coupling member 126 that is attached by a nut and bolt 128 to the jaw 118. The rotary coupling member 126 optionally includes a depending portion 130 that is slidably received in a slot 132 that extends centrally along the top of the frame member 20. It is not essential that the member 126 include the portion 130 inasmuch as the lower end of the nut and bolt assembly 128 extends downwardly into the slot 132 and can serve in conjunction therewith as a guide for the jaw 118. The arrangement is such that the crank 124 can be turned in a clockwise direction to forcibly urge the movable jaw 118 toward the fixed jaw 114, and in the opposite direction by counterclockwise direction of the crank 124.

The operation of the machine 10 will be readily understood. Assuming for the moment that the beam 26 does not oscillate about its pivot pin 28, it will be evident that rotation of the shaft 80 and the arm 82 fixed thereto will through the pitman 74 cause the link 48 to oscillate about its pivot 60. By virtue of the pivotal connection of the link 48 to the carriage 34, and the pivotal connections of the link 50 to the beam 26 and the carriage 34, oscillation of the link 48 will cause oscillation of the link 50. In the event that the four pivotal connections of the links 48 and 50 are at the apices of a true parallelogram, the oscillation of the link 50 will be identical to that of the oscillation of the link 48 with the result that the carriage 34 is movable relative to the beam 26 with such movement being constrained to be such that no relative rotation or oscillation occurs as between the frame 34 and the beam 26 with respect to a vertical plane normal to the axis of the pivot pin 28. In other words, such parallelism as may exist between the beam 26 and the carriage 34 is not disturbed during oscillatory movements of the links 48 and 50. Obviously, such relationship also exists between the saw blade 42 and the beam 26, and this is true whether or not the saw blade 42 is parallel to the beam 26. It will also be apparent that during oscillation of the links 48 and 50, the carriage 34 and the saw blade 42 carried thereby move vertically relative to the beam 26. In fact, the carriage 34 is guided for movement along a travel path that has both vertical and horizontal components, and such path is inclined to the longitudinal extent of the beam 26. This point is important for the reason that when the beam 26 is free to move about its pivot 28 and the saw blade 42 is maintained in cutting engagement with a workpiece 112, the beam 26 necessarily must oscillate about its pivot 28 and this in turn results in the frame 34 and the saw blade 42 being caused also to oscillate or rock about the pivot 28.

From the foregoing, it will be appreciated that even when the apices of the pivotal connections of the links 48 and 50 are disposed at the apices of a true parallelogram, the saw blade 42 is caused to oscillate about the pivot pin 28 with at least one oscillation cycle being completed during each oscillation cycle of the links 48 and 50; two, in the event that the movement of the links 48 and 50 pass back and forth through a rectangular configuration of the pivotal connections thereof.

From the foregoing then it is seen that the movement of the saw blade 42 with respect to the workpiece 112 is not such that the blade 42 remains parallel to itself.

Still assuming that the pivotal connections of the links 48 and 50 are at the apices of a true parallelogram the saw blade 42 does not necessarily have to be, as is preferred, parallel to the upper pivotal connections of the links 48 and 50, and if such nonparallelism is deemed necessary or expedient, it will be apparent that such nonparallelism will further accentuate the magnitude of oscillation of the beam 26 about its pivot 28 when the blade 42 is reciprocated and maintained in contact with a workpiece 112. It therefore follows that such nonparallelism of the blade 42 will result in increasing the magnitude of oscillation of the blade 42 about the pivot 28 that must occur during the sawing operation.

It should be emphasized that it is highly important that the saw blade 42 not only be reciprocated lengthwise in order to effect sawing, but that the blade 42 be caused to rock or oscillate with respect to the plane in which it is disposed so as to avoid the cut or groove being formed by the saw blade 42 being straight. In other words, it is highly desirable that the bottom of the cut or the groove be convex toward the straight line defined by the straight row of teeth 140 of the blade 42. Otherwise, the removal of cuttings, particularly in a cut that is long relative to the extent of the blade, is greatly impaired with resultant accelerated wear and damage to the blade 42, not to mention the deleterious effects of generation of excessive heat and the imposition of greater load requirements on the driving mechanism including the blade itself.

As mentioned previously, the positioning of the four pivotal connections of the links 48 and 50 may if desired be such as to define a true parallelogram; however, such is not preferred for the reason that the rocking action of the saw blade 42 can be enhanced by such pivotal connections departing somewhat from a true parallelogram. It is believed manifest that when the four pivotal connections depart from defining a true parallelogram, oscillation of the links 48 and 50 will necessarily result in a rocking motion of the carriage 34 and the saw blade 42 carried thereby. Accordingly, it is preferred that the spacing of the pivotal connections of the link 50 be somewhat greater than the spacing of the pivotal connections of the link 48. In an actual working embodiment of the invention, it has been found that excellent results can be obtained when the spacing between the pivotal connections of the link 50 is 11 inches when the spacing between the pivotal connections of the link 48 is 11 inches. In such working embodiment of the invention, the spacing between the lower pivotal connections of the links 48 and 50 to the carriage 34 is 14 ⅞ inches, and the spacing between the upper pivotal connections of the links 48 and 50 is 13⅞ inches. If desired, the previously described adjustability in the spacing between the upper pivotal connections enables if desired or deemed expedient an even greater departure of the pivotal connections of the links 48 and 50 from a true parallelogram.

The blade 42 is preferably mounted so that the cutting stroke occurs when the blade 42 moves to the left as shown in FIGS. 1 and 2, and the shaft 80 and the arm 82 fixed thereto are driven to rotate in the counterclockwise direction as viewed in FIGS. 1 and 2. With reference to FIG. 2, the full line position shown of the carriage 34, the beam 26 and the arm 82 corresponds to the position of such parts at about the midpoint of the cutting stroke, whereas the dashed line position of such parts shows a somewhat later stage of such cutting stroke, it being noted that as the cutting stroke progresses from about the middle thereof towards the end of such cutting stroke that the beam 26 rocks downward so as to vary the attitude of the saw blade 42. After the arm 82 has been rotated counterclockwise approximately 90° from the full line position shown thereof, the cutting stroke is completed and the beam 26 has rocked downwardly to the greatest position corresponding to the cut being made in the workpiece 112. It should be noted at this point that the pitman 74 is inclined upwardly from the carriage 34 throughout the cutting stroke with the pitman 74 being approximately horizontal at the beginning and the end of such cutting stroke. Upon further counterclockwise rotation of the arm 82, the return stroke of the blade 42 is commenced and the pitman 74 is throughout such return stroke inclined downwardly from its pivotal connection to the carriage 34. Throughout the first half of the return stroke (that is until the links 48 and 50 assume approximately vertical positions), the beam 26 is rocked upwardly and from the midpoint of the return stroke to the conclusion thereof the beam 26 rocks downwardly. The arrangement is such that two vertical oscillations of the beam 26 occur during each cycle of reciprocation of the carriage 34 or rotation of the arm 82.

In the preferred construction the shaft 80 is disposed at approximately the same height as the jaws 114 and 118 of the vice, and that the position of the pivotal connection between the carriage 34 and the pitman 74 is also approximately of such height with the result that the pitman 74 oscillates in its attitude through the horizontal plane. It should also be observed that, during the cutting stroke, the force with which the blade 42 is urged against the workpiece 112 by the weight of the carriage 34, beam 26, links 48 and 50, and the pitman 74 is augmented by the tensile force in the pitman 74 being directed in such a manner as to urge downward swinging movement of the beam 26. Conversely, during the return stroke of the blade 42, the force of the weight of the parts urging the blade 42 against the workpiece 112 is diminished by the compressive load in the pitman 74 being directed in such a manner as to cause upward swinging movement of the beam 26. Accordingly, the force with which the saw 42 bears against the workpiece 112 is less during the return stroke than during the cutting stroke.

Means is provided for limiting downward swinging movement of the beam 26 so that the beam 26 cannot swing downwardly by any substantial amount greater than that necessary for the saw blade 42 to pass through a workpiece 112. Such means is designated generally at 150 and comprises a bar or rod 152 having its lower end rigidly fixed to the frame member 20 by any suitable means, not shown, and such rod 152 extending upwardly toward the beam 26 intermediate the legs 30 and 32 thereof. Inasmuch as it is not only desirable to limit downward swinging movement of the beam 26 but also to deenergize the electric motor 84 upon completion of sawing through a workpiece, rather than simply limiting downward swinging movement of the beam 26 by direct engagement of the beam 26 with the upper end of the rod 152, a normally closed microswitch 154 is mounted by conventional means 156 to the upper end of the rod 152 in an arrangement such that the downward swinging movement of the beam 26 is limited by the movable actuating element 158 of the microswitch 154. Accordingly, the rod 152 with the microswitch 154 mounted thereon constitutes a stop limiting downward swinging movement of the beam 26. It will be understood that such stop or limiting action by the rod 152 and the microswitch 154 is accompanied by opening of the microswitch 154. It will be readily understood by those skilled in the art that when the leads 160 and 162 of the microswitch 154 are connected in electrical series with one of the conductors of the electric motor supply cord 164, the electric motor 84 is deenergized upon limiting of the downward swinging movement of the beam 26 by the rod 134 and the microswitch 154.

The machine 10 by reason of the rocking action of the saw blade limits the cut so that the teeth of the blade will not overload and break off, and also limits the amount of weight needed to sink the teeth of the saw blade into the workpiece, it being noted that such pressure can be the same whether a thin or thick section of metal is being cut.

It will be evident to those familiar with the art that the swing action of the links or hangers avoids any need for the use of conventional slide bearings that are prone to cause trouble due to wearing and sticking.

Inasmuch as the pivotal connection of the links or hangers to the carriage 34 are below the saw blade 42, any wear that will occur in such pivotal connection will not result in any misalignment of the saw with respect to the vertical plane.

The machine 10 is preferably of metallic construction throughout except for such obvious exceptions as the pulley belts 96 and 100, and special components such as the electric motor 84 and the microswitch 154.

Since the illustrated and described embodiment of the invention is susceptible to numerous variations and modifications without departing from the spirit of the invention, attention is directed to the appended claims in order to determine the actual scope of the invention.

I claim:

1. In a sawing machine, the improvement comprising a frame, an elongated beam pivotally mounted adjacent one end thereof on the frame for vertical swinging movement of the other end thereof about a horizontal axis, said beam being normally generally horizontally disposed whereby said beam is gravitationally urged to move said other end of the beam downwardly, a movable saw carriage means for holding a saw, means for movably mounting the carriage means on the beam comprising a pair of elongated links, each of said links having its opposite ends pivotally connected to the beam and the carriage means, respectively, with such pivotal connections of said links being about axes parallel to said horizontal axis, said links lying in a common plane normal to said horizontal axis and being spaced from each other, and means for oscillating said links about the axes of their pivotal connections to the beam.

2. The combination of claim 1, wherein the distance between the pivotal connections of one of said links is greater than the distance between the pivotal connections of the other of said links.

3. The combination of claim 1, wherein the spacing of the pivotal connections of the links to the carriage means is unequal to the spacing of the pivotal connections of the links to said beam.

4. The combination of claim 1, wherein the pivotal connection of one of the links to the beam is established by means movable lengthwise along the beam through a plurality of positions having differing spacings from the pivotal connection of the other link to the beam and means for securing the last recited means at a selected one of the plurality of positions, whereby the spacing of the pivotal connections of the links to the beam may be selectively varied.

5. The combination of claim 1, wherein the links depend from the beam, and wherein the carriage means is of an inverted U-shape and includes a generally horizontally disposed web portion connecting spaced depending legs, and means adjacent the lower ends of the legs for engaging and tensioning an elongated saw blade therebetween.

6. The combination of claim 5, wherein the pivotal connections of the links to the U-shaped carriage means are adjacent the lower ends of the legs of the latter and are spaced below the means for engaging a saw blade.

7. The combination of claim 5, wherein the means for oscillating the links comprises a shaft mounted on the frame for rotation about an axis parallel to said horizontal axis, power means for driving rotation of said shaft, a radially extending arm fixed to said shaft for rotation therewith, and a pitman having its opposite ends pivotally connected to the outer end of the arm and the carriage means, respectively.

8. The combination of claim 7, wherein a single pivot pin is common to the pivotal connections of the carriage means to the pitman and one of the links.

9. The combination of claim 7, wherein means for holding a workpiece is mounted on the frame, and said shaft being mounted on the frame in such a height relationship to the last recited means that the pivotal connection of the arm to the pitman has a travel path between heights respectively higher and lower than the means for holding a workpiece.

10. The combination of claim 7, wherein the power means includes an electric motor, and normally closed electric switch means operative to open and prevent electrical energization of the motor in response to said other end of the beam descending below a predetermined height.

11. The combination of claim 7, including means for holding a workpiece mounted on the frame, said last means being disposed below a portion of the beam that lies intermediate the pivotal connections of the links to the beam, said shaft being spaced horizontally from the means for holding a workpiece, and said shaft having a height differing from that of the means for holding a workpiece by less than the length of the arm.

12. The combination of claim 1, wherein the means for oscillating the links comprises a shaft mounted on the frame for rotation about an axis parallel to said horizontal axis, power means for driving rotation of said shaft, a radially extending arm fixed to said shaft for rotation therewith, a pitman having its opposite ends pivotally connected to the outer end of the arm and the carriage means, respectively, means for holding a workpiece mounted on the frame, and said means for oscillating the links being so constructed and arranged that the pitman is caused to rock back and forth through a horizontal attitude during rotation of the shaft when the machine is operated to saw a workpiece, whereby the vertical component of force exerted upon the carriage means is alternately upward and downward.